United States Patent Office 2,794,786
Patented June 4, 1957

2,794,786

THIONIN DYE-ION EXCHANGE RESIN INDICATOR COMPOUNDS

Harry L. Segal and Leon L. Miller, Rochester, N. Y., assignors to Security Trust Company of Rochester, New York, as trustee for Harry L. Segal Medical Research Fund No Drawing. Application May 27, 1955,
Serial No. 511,786

10 Claims. (Cl. 260—2.2)

This application is a continuation-in-part of our earlier application Serial No. 146,384, filed February 25, 1950 (now abandoned), and our copending application Serial No. 212,698, filed February 24, 1951.

In our earlier applications there are disclosed novel non-toxic, resin ion exchange indicator compositions, administered orally, in which at least about 0.02 millimole of displaceable, identifiable indicator ion per dose (2 gm. dose) of resin exchanger is administered in unit dosage form for determining without intubation whether the pH of gastric juice in a stomach is above or below a predetermined pH value, thus providing a diagnostic indicator of particular value in clinical medicine.

In clinical diagnosis certain diseases such as pernicious anemia are associated with no free HCl in the stomach secretion. Carcinoma of the stomach is usually associated with very little or no free hydrochloric acid. Prior to this invention, it was necessary to subject the individual to the unpleasant procedure of introducing a tube into the stomach. The resin indicator compounds described here will obviate the necessity of the use of the intubation procedure which is not only unpleasant, but may also be difficult and even impossible under certain conditions.

The cure of gastric cancer depends on discovering the disease while it is still confined within the limits of the stomach. Since the disease is frequently silent, symptoms will not be of much aid even under the most enlightened circumstances. To apply routine mass fluoroscopy, G. I. X-ray series and conventional gastroscopy indiscriminately to all persons in the gastric cancer age group is impractical at present. Yet these diagnostic procedures are the only available means to discover the silent gastric cancer. The next best procedure might be the application of these available diagnostic techniques to a smaller group of individuals, who seem particularly liable to develop gastric cancer.

It is generally recognized that the incidence of gastric cancer is 3 to 4 times higher in people with achlorhydria than in the general population. The incidence may be ten times more frequent in the achlorhydrias with pernicious anemia. The incidence of achlorhydria in patients who have developed gastric cancer is 65% to 70%, as compared to that of only about 20% in the comparable age groups who are prone to develop carcinoma.

The ion exchange indicator compounds of this invention are prepared either by replacing the hydrogen cations of a carboxylic exchange resin with an equivalent number of an indicator cation or by adding an indicator anion to an anion exchange resin. The indicator cation or anion must be non-toxic in the dose employed, readily absorbed from the gastrointestinal tract after displacement from the compound and easily detectable in the body fluid chosen for its detection. The milliequivalents of the indicator ion displaced from a specific ion exchange indicator compound depends upon certain ion exchange properties such as the pH of the solution as well as the acid binding capacity of the ion exchange resin. The in vitro estimation of the number of milliequivalents of the indicator ion eluted from a gram of compound by a specific pH of gastric secretion and by the various cations of small intestinal juice, plus the knowledge of the percent of such eluted ions to appear in the urine or blood collected during or after a definitive interval makes it possible to predict the dose and the range of gastric acidity detectable by each compound. Thus, this invention allows the determination of gastric acidity by the displacement of the identifiable indicator ions from the indicator resin compounds of this invention by the hydrogen ions of the HCl in the stomach. The indicator ions used are detectable by simple or relatively simple procedures.

This tubeless method has the important clinical advantage in that the diagnostic agent has no therapeutic or pharmacological effect on the body. The distress and alterations in the composition of gastric juice which may be experienced with the intubation technique are completely eliminated. This tubeless procedure may even be more accurate than the intubation technique for determining the specific range of gastric acidity detectable by the specific indicator ion exchange resin. Any discrepancy noted between the results of the intubation and tubeless techniques done on different days can be usually explained on a physiological basis. Gastric acidity may fluctuate for various reasons. In some cases, as already indicated, the mere act of intubation produces a cessation of gastric secretion. Reichsmann, Engel and Segal have found modification of the gastric secretory response to histamine during varying behavioral states in an infant with a gastric fistula. There is also a group whose gastric acid secretion may vary from no free acid to a low acid range.

Since the commercial ion exchange resin is a well-recognized material established by previous clinical and medical experience to be insoluble, inert and non-toxic in rats, dogs and human beings and since the indicator ion selected is also non-toxic in the amount employed in the unit dosage, the indicator compound formed therefrom is found to retain the desirable non-toxic properties of the separate ingredients in its diagnostic application.

Suitable ion exchange resin indicator compounds in accordance wth this invention may be prepared from commercially available cation and anion exchange resins such as Amberlite IRC-50 (XE-96), a granular copolymer of methacrylic acid and divinyl benzene, Permutit H, a carboxylated phenol formaldehyde resin, and Permutit 70 or Amberlite IR-4B, a free synthetic phenolaldehyde resin and Amberlite IRA-400.

Thus, the ion exchange resin indicator compounds may be derived from either cation exchangers or anion exchangers depending upon the charge of the indicating ion which it is desired to incorporate into the ion exchange resin indicator compound.

The cation exchange resin such as a granular copolymer of methacrylic acid and divinyl benzene is conditioned, as described later, and then is treated with a solution containing a predetermined amount of the indicator ion in salt form. The resulting ion exchange resin indicator compound is removed from the solution, washed and dried, and thus prepared for use.

The displaceable indicator ions of the compounds of this invention may be selected from a group of dyes or other indicator ions which are known to be non-toxic and innocuous to humans in much larger doses than that used in these compounds. These cation or anion indicators are incorporated into the ion exchange resin indicator compound in quantitatively controlled amounts to provide the diagnostic indicator of this invention.

It has been discovered that the detection of the minimal quantity of gastric hydrochloric acid can be infallibly determined only if enough indicator cations are present in the cation exchange resin indicator compound to be released in determinable amounts by the minimal quantity of hydrogen cations in the gastric juice. In testing for the presence of the minimal quantity in gastric juice excreted from a high acid stomach, the minimum quantity of indicator cation necessary in the ion exchange resin indicator compound may be as low as 0.02 millimole per dose of cation exchange resin indicator compound. In testing for the minimal quantity of gastric hydrochloric acid in gastric juice in stomachs having a low secretion of acid, the minimum quantity of indicator cation in the dose of cation exchange resin indicator compound will be proportionately higher. In every case, a quantity of 0.1 millimole of indicator cation in a dose of cation exchange resin indicator compound will be sufficient definitely to establish the presence of the minimal quantity of free gastric hydrochloric acid concentration.

The most important determination in an average gastric analysis is the estimation of the gastric acidity. The secretion of gastric hydrochloric acid by the parietal cells is constant. It is the volume not the concentration of parietal secretion, which varies and helps to determine the eventual concentration of the gastric acidity. Pure parietal secretion has an acidity of 165 meq./l. Yet the acid concentration of gastric contents usually is not above 60 C. U. (meq./l.). This is due to the changing proportion of parietal to non-parietal secretion as mucus, pepsin, etc.

The volume of gastric juice is generally parallel to the hydrochloric acid concentration determined therein. This is so because most of the water in gastric juice is secreted by the parietal cells. A high volume is generally accompanied by a high acid concentration. The volume, however, is not necessarily a direct measurement or indication of the acid concentration because duodenal juice, saliva and variations in mucus secretion affect the volume and thus indirectly the concentration of the hydrochloric acid.

Gastric acidity values are subdivided into four clinically significant ranges depending upon the meq./l. (clinical units) of HCl output; hyperacidity [50–100 meq. HCl/l. (pH 1.3–1.0)]; normal acidity [15–50 meq. HCl/l. (pH 1.8–1.3)]; low acidity [1–15 meq. HCl/l. (pH 3.5–1.8)]; achlorhydria [less than 1 meq. HCl/l. (pH 3.5–8.5)].

The displacement of the indicator cations from the indicator resin compound depends upon the hydrogen ion concentration (pH) as well as the quantity of the compound and the volume of solution to which the indicator compound is subjected. The average normal adult human stomach secretes about 2500 cc. of gastric juice in 24 hours under normal conditions. The range of secretion for a specific hour will depend upon certain conditions using appropriate stimulants such as caffeine sodium benzoate, histamine, etc. The average normal adult human stomach will secrete a volume of gastric juice ranging from 30 to 200 ml. averaging usually between 50 and 100 ml. Stomachs that secrete very little or no acid secrete on the average less than about 30 to 50 ml. of gastric juice in one hour after stimulation. Accordingly, on the basis of known acid secretion, an appropriate standardized unit has been predicted and administered to release a predetermined amount of indicator ion displaced by the hydrogen ions. The amount of these ions excreted in the urine will be an indication of the hydrogen ion concentration (pH) range which is characteristic of the indicator resin composition.

In vivo studies have shown us that the cation exchange resin indicator compound of this invention is administered best in a 2 gram dose for a given test of the presence of a minimal quantity of hydrogen cations in the gastric juice. This 2 gram dose is preferably made up of cation exchange indicator compounds containing preferably at least approximately 0.1 millimole of the indicator cation per dose of cation exchange resin compound and not less than 0.02 and not more than 0.50 millimole of cation indicator per dose of cation exchange resin compound.

Particularly useful indicator ion components are dyes or such ions which can be detected by a color change and which conform to the requirements above mentioned, i. e. non-toxic, not too readily displaced by any cations other than those associated with the HCl of the stomach, readily absorbed and excreted in the urine. Such dyes or ions are detected quantitatively by colorimetry or by comparison with appropriate color standards. This makes it possible to determine the amount of dye or ion excreted in the urine, present in blood, etc. within a certain predetermined time after the oral administration of the indicator resin compound. Gastric secretion may be stimulated using standard reagents such as caffeine sodium benzoate, alcohol, histamine, etc. Conditions of the test are standardized to provide reproduceable and accurate quantitative results.

Both the azo and quinone-imine group of dyes have been used as the indicator ions in preparing these compounds. Particular desirable dye indicator ions for colorimetric gastric acidity determinations, avoiding the inconvenience and disadvantage of intubation are certain of the basic dyes of the quinone-imine groups, the indamines. More specifically, the methylated amino derivatives of thiazins and their homologues which are substituted with two amino groups but the basicity of said amino groups being reduced by methyl substitution on the nitrogen atoms of said amino groups. These are symmetrical and asymmetrical methyl substituted thionins or their homologues free from solubilizing groups or acidic or basic reacting groups attached to the thionin nucleus. These basic dyes are blue, have a spectrophotometric absorption maxima in the range of about 610–670 millimicrons and are very well known as biological stains, see Conn, "Biological Stains," published by Biotech Publications, fifth edition, pages 90 through 95, 97 and 98.

These dyes are preferably used in the form of the chloride and include azure A, asymmetrical dimethyl thionin, azure C, monomethyl thionin, azure B, trimethyl thionin, Methylene Blue, tetramethyl thionin, as well as methyl homologues, such as Toluidine Blue O, Color Index No. 925. Also included are mixtures of these such as polychrome methylene blue, methylene azure, azure I and azure II, in which mixtures varying amounts of azure A and/or azure B are present.

The tetramethyl substituted thionin, methylene blue, which is typical of the entire class, is perhaps the best known non-toxic basic staining dye. Methylene blue is so readily oxidized that the presence of the azure (azure A), the lower methylated substitution products produced by such oxidation is universally recognized (see Conn). The presence of azure A in Stain Commission acceptable or medical grade USP methylene blue chloride, particularly where the methylene blue chloride solutions have been standing for some time accounts not only for some of the valuable staining properties of this preparation but also for improved gastric acidity determinations due to the presence of this material in the methylene blue ion exchange resin compounds of the present invention.

In order that this invention may be more fully understood, the following examples are given by way of illustration, but it is to be understood that the invention is not limited thereto as will be more specifically pointed out hereinafter.

EXAMPLE I

The cation resin Amberlite IRC–50 (XE–96) in the hydrogen form is treated with an aqueous solution of a suitable sodium salt or sodium hydroxide and then restored to the hydrogen cycle by eluting with hydrochloric or sulphuric acid. In the case of the methylene blue indicator exchange compound the cation exchange resin is conditioned as follows:

1. A measured amount of the cation exchange resin

Amberlite XE–96 is placed in distilled water for 24 hours, using 100 grams of resin to 225 ml. of water.

2. The resin and water mixture is poured into a glass column at the bottom of which is a perforated porcelain plate covered with nylon. The water is drawn off to one-half inch above the resin. Two percent HCl is added and allowed to run through at the rate of 70 ml. per minute until the percolate has a pH of 2 or less.

3. The column is then washed with distilled water until the pH of the percolate rises to between a pH of 4–5.

4. One percent sodium hydroxide is added until the percolate reaches a pH of 10 or more.

5. The column is again washed with distilled water until the pH of the percolate is between 8.5–9.0.

6. Two percent HCl is added until the pH becomes 2 or less and then the column is washed with distilled water until the pH rises to between 2.5 and 3.5.

The resin is now conditioned and ready for the methylene blue indicator cations. "MB" will be used to indicate the tetramethylaminophenothiazinium ion. Using the batch process the methylene blue indicator compound is made as follows:

1. Methylene blue hydrochloride is dissolved in distilled water and added to the conditioned resin so that the desired amount of methylene blue cations are available for each gram of resin. This is stirred for six hours.

2. The solution is decanted off and the resin compound is thoroughly washed with distilled water until no more dye is present in the wash.

3. The resulting methylene blue exchange indicator compound is dried at room temperature. Each gram of this methylene blue exchange indicator compound contains the desired amount of methylene blue per gram of indicator compound.

We have prepared and tested methylene blue resin compounds containing 34.5 milligrams, 65.3 milligrams, and 68.5 milligrams per gram of resin.

These compounds were tested with dilute solutions of HCl as well as with Ringer's solution and alcohol. The amount of dye displaced by the hydrogen ions of the HCl depended upon the hydrogen ion concentration. An insignificant amount of dye is displaced at a pH above 3 and also by the cations in Ringer's solution.

EXAMPLE II

A cation exchange resin made up of a granular copolymer of methacrylic acid and divinyl benzene hereinafter referred to as Amberlite XE–96 is first conditioned and then treated with azure A ($C_{14}$, $H_{14}N_3$, SCl) (molecular weight 291.8), for the preparation of an azure A ion exchange compound of this invention. Azure A cations are substituted for the quininium or methylene blue cations in an amount that will allow one gram of the azure A indicator compound to contain the amount of azure A desired per gram of azure A indicator compound as already stated.

Compounds were made containing both 45 mg. and 58 mg. per gram of resin (weight on air-dry basis).

The azure A indicator compound (45 mg. of azure A per gram of resin) was then placed in dilute HCl solutions of varying hydrogen ion concentration as well as in Ringer's solution in the following manner: One-tenth gram of the azure A indicator compound was placed in each of 13 test tubes, to 11 of which were added 10 ml. of HCl solution of varying hydrogen ion concentration. To each of the remaining 2 test tubes 10 ml. of distilled water and of Ringer's solution were added, respectively. The temperature was kept constant at 37.5° C. and the mixtures were stirred for 30 minutes by a slow stream of air. The amount of azure A eluted was determined with a Beckmann colorimeter.

The following table reveals the amount of axure A that was eluted from one gram of the azure A indicator compound subjected to 100 ml. of each of these solutions:

Table 1

| pH of HCl Solution | Amount in mg. of Azure A cations displaced from 1 gram of compound per 100 ml. of solution |
| --- | --- |
| .5 | 5.7 |
| .8 | 8.2 |
| 1.01 | 8.0 |
| 1.50 | 13.4 |
| 1.99 | 8.0 |
| 2.31 | 4.25 |
| 2.72 | 1.65 |
| 3.00 | 0.91 |
| 3.20 | 0.71 |
| 3.52 | 0.37 |
| 4.00 | 0.10 |
| $H_2O$ | 0.00 |
| Ringer's solution | 0.72 |

In preliminary clinical study the excretion time of the azure A dye was determined by measuring the amount of the dye excreted in urines obtained one hour and two hours following the oral administration of azure A in 20 or 40 mg. doses. The amount of azure A in the total two-hour excretion of 18 patients was found to vary from 7 to 26 percent with an average of approximately 15 percent. From this excretion factor and from the amount of azure A displaced in vitro by hydrochloric acid and by Ringer's solutions, a dose of 2 grams of the azure A resin compound was predicted as the most appropriate dose.

Definitive evaluation of the azure A indicator compound by us resulted from the clinical trial in 279 individuals at the established dose level of 2 grams. The gastric secretory response of 100 of these individuals to caffeine was determined by intubation. The gastric secretory response of the remaining 179 individuals was determined by the quininium resin indicator compound. On the trial day, breakfast was omitted. A glass of water containing 500 mgs. of caffeine sodium benzoate was administered to stimulate gastric secretion, and a control urine was collected one hour thereafter. The azure A indicator compound was administered in water and urines were collected one and two hours or only two hours thereafter. The amount of azure A present in the first and second hour excretions or in the total two-hour urine excretion was estimated both by the use of a Beckmann spectrophotometer at 620 millimicrons and by means of simple colorimetric comparator standards.

The interpretation of the results obtained with the azure A resin compound containing 45 mg. of azure A per gram of resin is summarized as follows:

| Free Gastric HCl Secretion | Mg.[1] of AzureA in 2-Hour Urine |
| --- | --- |
| Present | 0.6 or more. |
| Absent | 0.3 or less. |
| Borderline | 0.3–0.6. |

[1] This will depend upon the amount of azure A per gram of resin.

Table 2 is a summary of the results in the 279 individuals tested with azure A resin compounds. The five discrepancies can be explained on the physiological bases previously described.

Table 2

TUBELESS GASTRIC ANALYSES WITH AZURE A RESIN COMPOUND

| Control Group | No. of Indiv. | Results | |
| --- | --- | --- | --- |
| | | Consistent | Non-Consistent |
| Free Acid | 208 | 206 | 2 |
| Achlorhydric | 57 | 55 | 2 |
| Intermittent or Borderline Secretors | 9 | 9 | 0 |
| Sub-total Gastrectomy | 5 | 4 | 1 |
| Total | 279 | 274 | 5 |

PROCEDURE OF THE TUBELESS GASTRIC ANALYSIS TECHNIQUE

In performing these tests, the following procedure is used. The individual takes no food after midnight. At a designated hour the next morning the individual urinates and saves this urine for a control. The individual then drinks a glass of water containing the gastric stimulant such as caffeine sodium benzoate. One hour after drinking the water with the stimulant, the individual urinates and saves the urine as a second control. He then takes the ion exchange resin indicator compound in about one-half glass of water. The dose is stirred vigorously and then is drunk immediately. The individual then urinates 1 and 2 or just 2 hours after consuming the dose. This or these urine specimens are tested for the amount of displaced indicator ions. The time of the test may be shortened by omitting the gastric stimulant. However, the standard test with the gastric stimulant must be repeated if the abbreviated test is negative for free acid.

The gastric acidity of the individuals who were the subjects of these tests was determined by removing samples of the gastric juice from each of the individuals by the usual intubation technique. The gastric acidity tests of the samples so obtained indicated that the subjects could be divided into a group in whom no free hydrochloric acid was present in the gastric juice and a group in whom there was free hydrochloric acid in the gastric juice. Each of the subjects was tested for free hydrochloric acid in the gastric juice by use of the ion exchange indicator compound of this invention.

Thus, as we have pointed out, this invention has provided for the determination of gastric acidity by the displacement of identifiable indicator ions from the indicator resin compounds by the hydrogen ions of the HCl of the stomach. The indicator ions are detectable by what we believe to be simple and effective procedures. Within the spirit of this disclosure we, therefore, claim as our invention the following:

1. A diagnostic indicator ion exchange compound for determining without intubation whether the pH of gastric juice in a stomach is above or below a predetermined pH value, comprising a non-toxic, insoluble granulated cation exchange complex synthetic polymer resin containing from about 0.01 millimole to about 0.6 millimole of displaceable non-toxic thionin dye ions per gram of resin so as to be displaceable from the ion exchange resin predominantly by the ions from free hydrochloric acid secreted in the stomach, said dye ions being absorbed readily from the gastrointestinal tract and being easily detected by the dye color in urine or blood.

2. A compound as claimed in claim 1 wherein said dye ion is a cation from polychrome methylene blue.

3. A compound as claimed in claim 1 wherein said dye ion is the cation from azure A.

4. A compound as claimed in claim 1 wherein said dye ion is a cation from azure B.

5. A compound as in claim 2 wherein said resin is a copolymer of methacrylic acid and divinyl benzene.

6. A compound as in claim 3 wherein said resin is a copolymer or methacrylic acid and divinyl benzene.

7. A compound as in claim 4 wherein said resin is a copolymer of methacrylic acid and divinyl benzene.

8. A compound as in claim 1 wherein said anion exchange resin is a phenol aldehyde resin.

9. A compound as claimed in claim 1 wherein said dye cation is the cation from toluidine blue.

10. A compound as claimed in claim 1 wherein said dye cation is the cation from azure C.

References Cited in the file of this patent
UNITED STATES PATENTS 2,119,189    Widmer _____ May 31, 1938

OTHER REFERENCES

Conn: "Biological Stains," pages 90–95, 97 and 98. Pub. by Biotech Pub., Geneva, N. Y., 1946.

Richardson: "Nature," volume 164, No. 4178, pages 916–917, November 26, 1949.